United States Patent
Hamza

(10) Patent No.: US 8,280,119 B2
(45) Date of Patent: Oct. 2, 2012

(54) IRIS RECOGNITION SYSTEM USING QUALITY METRICS

(75) Inventor: Rida Hamza, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 873 days.

(21) Appl. No.: 12/329,346

(22) Filed: Dec. 5, 2008

(65) Prior Publication Data

US 2010/0142765 A1 Jun. 10, 2010

(51) Int. Cl.
*G06K 9/00* (2006.01)
(52) U.S. Cl. .......................... 382/117; 382/115
(58) Field of Classification Search .................. 382/103, 382/115, 117, 118, 154; 356/4.03, 4.04, 356/4.05, 4.06, 4.07, 18, 492, 493, 496, 498
See application file for complete search history.

(56) References Cited

U.S. PATENT DOCUMENTS

| | | |
|---|---|---|
| 4,641,349 A | 2/1987 | Flom et al. |
| 4,836,670 A | 6/1989 | Hutchinson |
| 5,231,674 A | 7/1993 | Cleveland et al. |
| 5,291,560 A | 3/1994 | Daugman |
| 5,293,427 A | 3/1994 | Ueno et al. |
| 5,359,382 A | 10/1994 | Uenaka |
| 5,404,013 A | 4/1995 | Tajima |
| 5,551,027 A | 8/1996 | Choy et al. |
| 5,572,596 A | 11/1996 | Wildes et al. |
| 5,608,472 A | 3/1997 | Szirth et al. |
| 5,664,239 A | 9/1997 | Nakata |
| 5,687,031 A | 11/1997 | Ishihara |
| 5,717,512 A | 2/1998 | Chmielewski, Jr. et al. |
| 5,751,836 A | 5/1998 | Wildes et al. |
| 5,859,686 A | 1/1999 | Aboutalib et al. |
| 5,860,032 A | 1/1999 | Iwane |
| 5,896,174 A | 4/1999 | Nakata |
| 5,901,238 A | 5/1999 | Matsushita |
| 5,909,269 A | 6/1999 | Isogai et al. |
| 5,953,440 A | 9/1999 | Zhang et al. |
| 5,956,122 A | 9/1999 | Doster |
| 5,978,494 A | 11/1999 | Zhang |
| 6,005,704 A | 12/1999 | Chmielewski, Jr. et al. |
| 6,007,202 A | 12/1999 | Apple et al. |
| 6,012,376 A | 1/2000 | Hanke et al. |
| 6,021,210 A | 2/2000 | Camus et al. |

(Continued)

FOREIGN PATENT DOCUMENTS

EP 0484076 5/1992

(Continued)

OTHER PUBLICATIONS

Bonney et al., "Iris Pattern Extraction Using Bit Planes and Standard Deviations," IEEE, pp. 582-586, 2004.

(Continued)

*Primary Examiner* — Brian Le
(74) *Attorney, Agent, or Firm* — Seager, Tufte, & Wickhem LLC.

(57) ABSTRACT

A system for iris recognition using a set of quality metrics, which may include eye image validation, blur assessment, offset, gazing, obscuration, visibility, and the like. These metrics may be established as quantitative measures which can automatically assess the quality of eye images before they are processed for recognition purposes. Quadrant iris analysis, histograms, map processing enhancements, and multi-band analysis may be used in aiding in the iris recognition approach.

10 Claims, 14 Drawing Sheets

U.S. PATENT DOCUMENTS

| | | |
|---|---|---|
| 6,028,949 A | 2/2000 | McKendall |
| 6,055,322 A | 4/2000 | Salganicoff et al. |
| 6,064,752 A | 5/2000 | Rozmus et al. |
| 6,069,967 A | 5/2000 | Rozmus et al. |
| 6,081,607 A | 6/2000 | Mori et al. |
| 6,088,470 A | 7/2000 | Camus et al. |
| 6,091,899 A | 7/2000 | Konishi et al. |
| 6,101,477 A | 8/2000 | Hohle et al. |
| 6,104,431 A | 8/2000 | Inoue et al. |
| 6,108,636 A | 8/2000 | Yap et al. |
| 6,119,096 A | 9/2000 | Mann et al. |
| 6,120,461 A | 9/2000 | Smyth |
| 6,134,339 A | 10/2000 | Luo |
| 6,144,754 A | 11/2000 | Okano et al. |
| 6,246,751 B1 | 6/2001 | Bergl et al. |
| 6,247,813 B1 | 6/2001 | Kim et al. |
| 6,252,977 B1 | 6/2001 | Salganicoff et al. |
| 6,259,478 B1 | 7/2001 | Hori |
| 6,282,475 B1 | 8/2001 | Washington |
| 6,285,505 B1 | 9/2001 | Melville et al. |
| 6,285,780 B1 | 9/2001 | Yamakita et al. |
| 6,289,113 B1 | 9/2001 | McHugh et al. |
| 6,299,306 B1 | 10/2001 | Braithwaite et al. |
| 6,308,015 B1 | 10/2001 | Matsumoto |
| 6,309,069 B1 | 10/2001 | Seal et al. |
| 6,320,610 B1 | 11/2001 | Van Sant et al. |
| 6,320,612 B1 | 11/2001 | Young |
| 6,320,973 B2 | 11/2001 | Suzaki et al. |
| 6,323,761 B1 | 11/2001 | Son |
| 6,325,765 B1 | 12/2001 | Hay et al. |
| 6,330,674 B1 | 12/2001 | Angelo et al. |
| 6,332,193 B1 | 12/2001 | Glass et al. |
| 6,344,683 B1 | 2/2002 | Kim |
| 6,370,260 B1 | 4/2002 | Pavlidis et al. |
| 6,377,699 B1 | 4/2002 | Musgrave et al. |
| 6,393,136 B1 | 5/2002 | Amir et al. |
| 6,400,835 B1 | 6/2002 | Lemelson et al. |
| 6,424,727 B1 | 7/2002 | Musgrave et al. |
| 6,424,845 B1 | 7/2002 | Emmoft et al. |
| 6,433,818 B1 | 8/2002 | Steinberg et al. |
| 6,438,752 B1 | 8/2002 | McClard |
| 6,441,482 B1 | 8/2002 | Foster |
| 6,446,045 B1 | 9/2002 | Stone et al. |
| 6,483,930 B1 | 11/2002 | Musgrave et al. |
| 6,484,936 B1 | 11/2002 | Nicoll et al. |
| 6,490,443 B1 | 12/2002 | Freeny, Jr. |
| 6,493,669 B1 | 12/2002 | Curry et al. |
| 6,494,363 B1 | 12/2002 | Roger et al. |
| 6,503,163 B1 | 1/2003 | Van Sant et al. |
| 6,505,193 B1 | 1/2003 | Musgrave et al. |
| 6,506,078 B1 | 1/2003 | Mori et al. |
| 6,508,397 B1 | 1/2003 | Do |
| 6,516,078 B1 | 2/2003 | Yang et al. |
| 6,516,087 B1 | 2/2003 | Camus |
| 6,516,416 B2 | 2/2003 | Gregg et al. |
| 6,522,772 B1 | 2/2003 | Morrison et al. |
| 6,523,165 B2 | 2/2003 | Liu et al. |
| 6,526,160 B1 | 2/2003 | Ito |
| 6,532,298 B1 | 3/2003 | Cambier et al. |
| 6,540,392 B1 | 4/2003 | Braithwaite |
| 6,542,624 B1 | 4/2003 | Oda |
| 6,546,121 B1 | 4/2003 | Oda |
| 6,553,494 B1 | 4/2003 | Glass |
| 6,580,356 B1 | 6/2003 | Alt et al. |
| 6,591,001 B1 | 7/2003 | Oda et al. |
| 6,591,064 B2 | 7/2003 | Higashiyama et al. |
| 6,594,377 B1 | 7/2003 | Kim et al. |
| 6,594,399 B1 | 7/2003 | Camus et al. |
| 6,598,971 B2 | 7/2003 | Cleveland |
| 6,600,878 B2 | 7/2003 | Pregara |
| 6,614,919 B1 | 9/2003 | Suzaki et al. |
| 6,652,099 B2 | 11/2003 | Chae et al. |
| 6,674,367 B2 | 1/2004 | Sweatte |
| 6,690,997 B2 | 2/2004 | Rivalto |
| 6,708,176 B2 | 3/2004 | Strunk et al. |
| 6,711,562 B1 | 3/2004 | Ross et al. |
| 6,714,665 B1 | 3/2004 | Hanna et al. |
| 6,718,049 B2 | 4/2004 | Pavlidis et al. |
| 6,718,665 B2 | 4/2004 | Hess et al. |
| 6,732,278 B2 | 5/2004 | Baird, III et al. |
| 6,734,783 B1 | 5/2004 | Anbai |
| 6,745,520 B2 | 6/2004 | Yesh et al. |
| 6,750,435 B2 | 6/2004 | Ford |
| 6,751,733 B1 | 6/2004 | Nakamura et al. |
| 6,753,919 B1 | 6/2004 | Daugman |
| 6,754,640 B2 | 6/2004 | Bozeman |
| 6,760,467 B1 | 7/2004 | Min et al. |
| 6,765,470 B2 | 7/2004 | Shinzaki |
| 6,766,041 B2 | 7/2004 | Golden et al. |
| 6,775,774 B1 | 8/2004 | Harper |
| 6,785,406 B1 | 8/2004 | Kamada |
| 6,793,134 B2 | 9/2004 | Clark |
| 6,819,219 B1 | 11/2004 | Bolle et al. |
| 6,829,370 B1 | 12/2004 | Pavlidis et al. |
| 6,832,044 B2 | 12/2004 | Doi et al. |
| 6,836,554 B1 | 12/2004 | Bolle et al. |
| 6,837,436 B2 | 1/2005 | Swartz et al. |
| 6,845,879 B2 | 1/2005 | Park |
| 6,853,444 B2 | 2/2005 | Haddad |
| 6,867,683 B2 | 3/2005 | Calvesio et al. |
| 6,873,960 B1 | 3/2005 | Wood et al. |
| 6,896,187 B2 | 5/2005 | Stockhammer |
| 6,905,411 B2 | 6/2005 | Nguyen et al. |
| 6,920,237 B2 | 7/2005 | Chen et al. |
| 6,930,707 B2 | 8/2005 | Bates et al. |
| 6,934,849 B2 | 8/2005 | Kramer et al. |
| 6,950,139 B2 | 9/2005 | Fujinawa |
| 6,954,738 B2 | 10/2005 | Wang et al. |
| 6,957,341 B2 | 10/2005 | Rice et al. |
| 6,972,797 B2 | 12/2005 | Izumi |
| 6,992,562 B2 | 1/2006 | Fuks et al. |
| 7,030,351 B2 | 4/2006 | Wasserman et al. |
| 7,053,948 B2 | 5/2006 | Konishi |
| 7,071,971 B2 | 7/2006 | Elberbaum |
| 7,084,904 B2 | 8/2006 | Liu et al. |
| 7,136,581 B2 | 11/2006 | Fujii |
| 7,183,895 B2 | 2/2007 | Bazakos et al. |
| 7,184,577 B2 | 2/2007 | Chen et al. |
| 7,197,173 B2 | 3/2007 | Jones et al. |
| 7,204,425 B2 | 4/2007 | Mosher, Jr. et al. |
| 7,277,561 B2 | 10/2007 | Shin |
| 7,277,891 B2 | 10/2007 | Howard et al. |
| 7,298,873 B2 | 11/2007 | Miller, Jr. et al. |
| 7,298,874 B2 | 11/2007 | Cho |
| 7,315,233 B2 | 1/2008 | Yuhara |
| 7,362,210 B2 | 4/2008 | Bazakos et al. |
| 7,362,370 B2 | 4/2008 | Sakamoto et al. |
| 7,362,884 B2 | 4/2008 | Willis et al. |
| 7,365,771 B2 | 4/2008 | Kahn et al. |
| 7,380,938 B2 | 6/2008 | Chmielewski, Jr. et al. |
| 7,406,184 B2 | 7/2008 | Wolff et al. |
| 7,414,648 B2 | 8/2008 | Imada |
| 7,417,682 B2 | 8/2008 | Kuwakino et al. |
| 7,418,115 B2 | 8/2008 | Northcott et al. |
| 7,421,097 B2 | 9/2008 | Hamza et al. |
| 7,443,441 B2 | 10/2008 | Hiraoka |
| 7,460,693 B2 | 12/2008 | Loy et al. |
| 7,471,451 B2 | 12/2008 | Dent et al. |
| 7,486,806 B2 | 2/2009 | Azuma et al. |
| 7,518,651 B2 | 4/2009 | Butterworth |
| 7,537,568 B2 | 5/2009 | Moehring |
| 7,538,326 B2 | 5/2009 | Johnson et al. |
| 7,542,945 B2 | 6/2009 | Thompson et al. |
| 7,580,620 B2 | 8/2009 | Raskar et al. |
| 7,593,550 B2 | 9/2009 | Hamza |
| 7,639,846 B2 | 12/2009 | Yoda |
| 7,722,461 B2 | 5/2010 | Gatto et al. |
| 7,751,598 B2 | 7/2010 | Matey et al. |
| 7,756,301 B2 | 7/2010 | Hamza |
| 7,756,407 B2 | 7/2010 | Raskar |
| 7,761,453 B2 | 7/2010 | Hamza |
| 7,777,802 B2 | 8/2010 | Shinohara et al. |
| 7,804,982 B2 | 9/2010 | Howard et al. |
| 8,045,764 B2 * | 10/2011 | Hamza .................... 382/117 |
| 2001/0026632 A1 | 10/2001 | Tamai |
| 2001/0027116 A1 | 10/2001 | Baird |
| 2001/0047479 A1 | 11/2001 | Bromba et al. |

| Pub. No. | Date | Name |
|---|---|---|
| 2001/0051924 A1 | 12/2001 | Uberti |
| 2001/0054154 A1 | 12/2001 | Tam |
| 2002/0010857 A1 | 1/2002 | Karthik |
| 2002/0033896 A1 | 3/2002 | Hatano |
| 2002/0039433 A1 | 4/2002 | Shin |
| 2002/0040434 A1 | 4/2002 | Elliston et al. |
| 2002/0062280 A1 | 5/2002 | Zachariassen et al. |
| 2002/0077841 A1 | 6/2002 | Thompson |
| 2002/0089157 A1 | 7/2002 | Breed et al. |
| 2002/0106113 A1 | 8/2002 | Park |
| 2002/0112177 A1 | 8/2002 | Voltmer et al. |
| 2002/0114495 A1 | 8/2002 | Chen et al. |
| 2002/0130961 A1 | 9/2002 | Lee et al. |
| 2002/0131622 A1 | 9/2002 | Lee et al. |
| 2002/0139842 A1 | 10/2002 | Swaine |
| 2002/0140715 A1 | 10/2002 | Smet |
| 2002/0142844 A1 | 10/2002 | Kerr |
| 2002/0144128 A1 | 10/2002 | Rahman et al. |
| 2002/0150281 A1 | 10/2002 | Cho |
| 2002/0154794 A1 | 10/2002 | Cho |
| 2002/0158750 A1 | 10/2002 | Almalik |
| 2002/0164054 A1 | 11/2002 | McCartney et al. |
| 2002/0175182 A1 | 11/2002 | Matthews |
| 2002/0186131 A1 | 12/2002 | Fettis |
| 2002/0191075 A1 | 12/2002 | Doi et al. |
| 2002/0191076 A1 | 12/2002 | Wada et al. |
| 2002/0194128 A1 | 12/2002 | Maritzen et al. |
| 2002/0194131 A1 | 12/2002 | Dick |
| 2002/0198731 A1 | 12/2002 | Barnes et al. |
| 2003/0002714 A1 | 1/2003 | Wakiyama |
| 2003/0012413 A1 | 1/2003 | Kusakari et al. |
| 2003/0014372 A1 | 1/2003 | Wheeler et al. |
| 2003/0020828 A1 | 1/2003 | Ooi et al. |
| 2003/0038173 A1 | 2/2003 | Blackson et al. |
| 2003/0046228 A1 | 3/2003 | Berney |
| 2003/0053663 A1 | 3/2003 | Chen et al. |
| 2003/0055689 A1 | 3/2003 | Block et al. |
| 2003/0055787 A1 | 3/2003 | Fujii |
| 2003/0058492 A1 | 3/2003 | Wakiyama |
| 2003/0061172 A1 | 3/2003 | Robinson |
| 2003/0061233 A1 | 3/2003 | Manasse et al. |
| 2003/0065626 A1 | 4/2003 | Allen |
| 2003/0071743 A1 | 4/2003 | Seah et al. |
| 2003/0072475 A1 | 4/2003 | Tamori |
| 2003/0073499 A1 | 4/2003 | Reece |
| 2003/0074317 A1 | 4/2003 | Hofi |
| 2003/0074326 A1 | 4/2003 | Byers |
| 2003/0076161 A1 | 4/2003 | Tisse |
| 2003/0076300 A1 | 4/2003 | Lauper et al. |
| 2003/0076984 A1 | 4/2003 | Tisse et al. |
| 2003/0080194 A1 | 5/2003 | O'Hara et al. |
| 2003/0091215 A1 | 5/2003 | Lauper et al. |
| 2003/0092489 A1 | 5/2003 | Veradej |
| 2003/0095689 A1 | 5/2003 | Volkommer et al. |
| 2003/0098776 A1 | 5/2003 | Friedli |
| 2003/0099379 A1 | 5/2003 | Monk et al. |
| 2003/0099381 A1 | 5/2003 | Ohba |
| 2003/0103652 A1 | 6/2003 | Lee et al. |
| 2003/0107097 A1 | 6/2003 | McArthur et al. |
| 2003/0107645 A1 | 6/2003 | Yoon |
| 2003/0108224 A1 | 6/2003 | Ike |
| 2003/0108225 A1 | 6/2003 | Li |
| 2003/0115148 A1 | 6/2003 | Takhar |
| 2003/0115459 A1 | 6/2003 | Monk |
| 2003/0116630 A1 | 6/2003 | Carey et al. |
| 2003/0118212 A1 | 6/2003 | Min et al. |
| 2003/0118217 A1 | 6/2003 | Kondo et al. |
| 2003/0123711 A1 | 7/2003 | Kim et al. |
| 2003/0125054 A1 | 7/2003 | Garcia |
| 2003/0125057 A1 | 7/2003 | Pesola |
| 2003/0126560 A1 | 7/2003 | Kurapati et al. |
| 2003/0131245 A1 | 7/2003 | Linderman |
| 2003/0131265 A1 | 7/2003 | Bhakta |
| 2003/0133597 A1 | 7/2003 | Moore et al. |
| 2003/0140235 A1 | 7/2003 | Immega et al. |
| 2003/0140928 A1 | 7/2003 | Bui et al. |
| 2003/0141411 A1 | 7/2003 | Pandya et al. |
| 2003/0149881 A1 | 8/2003 | Patel et al. |
| 2003/0152251 A1 | 8/2003 | Ike |
| 2003/0152252 A1 | 8/2003 | Kondo et al. |
| 2003/0156741 A1 | 8/2003 | Lee et al. |
| 2003/0158762 A1 | 8/2003 | Wu |
| 2003/0158821 A1 | 8/2003 | Maia |
| 2003/0159051 A1 | 8/2003 | Hollnagel |
| 2003/0163739 A1 | 8/2003 | Armington et al. |
| 2003/0169334 A1 | 9/2003 | Braithwaite et al. |
| 2003/0169901 A1 | 9/2003 | Pavlidis et al. |
| 2003/0169907 A1 | 9/2003 | Edwards et al. |
| 2003/0173408 A1 | 9/2003 | Mosher, Jr. et al. |
| 2003/0174049 A1 | 9/2003 | Beigel et al. |
| 2003/0177051 A1 | 9/2003 | Driscoll et al. |
| 2003/0182151 A1 | 9/2003 | Taslitz |
| 2003/0182182 A1 | 9/2003 | Kocher |
| 2003/0189480 A1 | 10/2003 | Hamid |
| 2003/0189481 A1 | 10/2003 | Hamid |
| 2003/0191949 A1 | 10/2003 | Odagawa |
| 2003/0194112 A1 | 10/2003 | Lee |
| 2003/0195935 A1 | 10/2003 | Leeper |
| 2003/0198368 A1 | 10/2003 | Kee |
| 2003/0200180 A1 | 10/2003 | Phelan, III et al. |
| 2003/0210139 A1 | 11/2003 | Brooks et al. |
| 2003/0210802 A1 | 11/2003 | Schuessier |
| 2003/0218719 A1 | 11/2003 | Abourizk et al. |
| 2003/0225711 A1 | 12/2003 | Paping |
| 2003/0228898 A1 | 12/2003 | Rowe |
| 2003/0233556 A1 | 12/2003 | Angelo et al. |
| 2003/0235326 A1 | 12/2003 | Morikawa et al. |
| 2003/0235411 A1 | 12/2003 | Morikawa et al. |
| 2003/0236120 A1 | 12/2003 | Reece et al. |
| 2004/0001614 A1 | 1/2004 | Russon et al. |
| 2004/0002894 A1 | 1/2004 | Kocher |
| 2004/0005078 A1 | 1/2004 | Tillotson |
| 2004/0006553 A1 | 1/2004 | de Vries et al. |
| 2004/0010462 A1 | 1/2004 | Moon et al. |
| 2004/0012760 A1 | 1/2004 | Mihashi et al. |
| 2004/0019570 A1 | 1/2004 | Bolle et al. |
| 2004/0023664 A1 | 2/2004 | Mirouze et al. |
| 2004/0023709 A1 | 2/2004 | Beaulieu et al. |
| 2004/0025030 A1 | 2/2004 | Corbett-Clark et al. |
| 2004/0025031 A1 | 2/2004 | Ooi et al. |
| 2004/0025053 A1 | 2/2004 | Hayward |
| 2004/0029564 A1 | 2/2004 | Hodge |
| 2004/0030930 A1 | 2/2004 | Nomura |
| 2004/0035123 A1 | 2/2004 | Kim et al. |
| 2004/0037450 A1 | 2/2004 | Bradski |
| 2004/0039914 A1 | 2/2004 | Barr et al. |
| 2004/0042641 A1 | 3/2004 | Jakubowski |
| 2004/0044627 A1 | 3/2004 | Russell et al. |
| 2004/0046640 A1 | 3/2004 | Jourdain et al. |
| 2004/0049687 A1 | 3/2004 | Orsini et al. |
| 2004/0050924 A1 | 3/2004 | Mletzko et al. |
| 2004/0050930 A1 | 3/2004 | Rowe |
| 2004/0052405 A1 | 3/2004 | Walfridsson |
| 2004/0052418 A1 | 3/2004 | DeLean |
| 2004/0059590 A1 | 3/2004 | Mercredi et al. |
| 2004/0059953 A1 | 3/2004 | Purnell |
| 2004/0104266 A1 | 6/2004 | Bolle et al. |
| 2004/0117636 A1 | 6/2004 | Cheng |
| 2004/0133804 A1 | 7/2004 | Smith et al. |
| 2004/0146187 A1 | 7/2004 | Jeng |
| 2004/0148526 A1 | 7/2004 | Sands et al. |
| 2004/0160518 A1 | 8/2004 | Park |
| 2004/0162870 A1 | 8/2004 | Matsuzaki et al. |
| 2004/0162984 A1 | 8/2004 | Freeman et al. |
| 2004/0169817 A1 | 9/2004 | Grotehusmann et al. |
| 2004/0172541 A1 | 9/2004 | Ando et al. |
| 2004/0174070 A1 | 9/2004 | Voda et al. |
| 2004/0190759 A1 | 9/2004 | Caldwell |
| 2004/0193893 A1 | 9/2004 | Braithwaite et al. |
| 2004/0219902 A1 | 11/2004 | Lee et al. |
| 2004/0233038 A1 | 11/2004 | Beenau et al. |
| 2004/0240711 A1 | 12/2004 | Hamza et al. |
| 2004/0252866 A1 | 12/2004 | Tisse et al. |
| 2004/0255168 A1 | 12/2004 | Murashita et al. |
| 2005/0008200 A1 | 1/2005 | Azuma et al. |
| 2005/0008201 A1 | 1/2005 | Lee et al. |
| 2005/0012817 A1 | 1/2005 | Hampapur et al. |
| 2005/0029353 A1 | 2/2005 | Isemura et al. |

| Publication | Date | Name | | Country | Number | Date |
|---|---|---|---|---|---|---|
| 2005/0052566 A1 | 3/2005 | Kato | | GB | 2371396 | 7/2002 |
| 2005/0055582 A1 | 3/2005 | Bazakos et al. | | GB | 2375913 | 11/2002 |
| 2005/0063567 A1 | 3/2005 | Saitoh et al. | | GB | 2402840 | 12/2004 |
| 2005/0084137 A1 | 4/2005 | Kim et al. | | GB | 2411980 | 9/2005 |
| 2005/0084179 A1 | 4/2005 | Hanna et al. | | JP | 9161135 | 6/1997 |
| 2005/0099288 A1 | 5/2005 | Spitz et al. | | JP | 9198545 | 7/1997 |
| 2005/0102502 A1 | 5/2005 | Sagen | | JP | 9201348 | 8/1997 |
| 2005/0110610 A1 | 5/2005 | Bazakos et al. | | JP | 9147233 | 9/1997 |
| 2005/0125258 A1 | 6/2005 | Yellin et al. | | JP | 9234264 | 9/1997 |
| 2005/0127161 A1 | 6/2005 | Smith et al. | | JP | 9305765 | 11/1997 |
| 2005/0129286 A1 | 6/2005 | Hekimian | | JP | 9319927 | 12/1997 |
| 2005/0134796 A1 | 6/2005 | Zelvin et al. | | JP | 10021392 | 1/1998 |
| 2005/0138385 A1 | 6/2005 | Friedli et al. | | JP | 10040386 | 2/1998 |
| 2005/0138387 A1 | 6/2005 | Lam et al. | | JP | 10049728 | 2/1998 |
| 2005/0146640 A1 | 7/2005 | Shibata | | JP | 10137219 | 5/1998 |
| 2005/0151620 A1 | 7/2005 | Neumann | | JP | 10137221 | 5/1998 |
| 2005/0152583 A1 | 7/2005 | Kondo et al. | | JP | 10137222 | 5/1998 |
| 2005/0193212 A1 | 9/2005 | Yuhara | | JP | 10137223 | 5/1998 |
| 2005/0199708 A1 | 9/2005 | Friedman | | JP | 10248827 | 9/1998 |
| 2005/0206501 A1 | 9/2005 | Farhat | | JP | 10269183 | 10/1998 |
| 2005/0206502 A1 | 9/2005 | Bernitz | | JP | 11047117 | 2/1999 |
| 2005/0207614 A1 | 9/2005 | Schonberg et al. | | JP | 11089820 | 4/1999 |
| 2005/0210267 A1 | 9/2005 | Sugano et al. | | JP | 11200684 | 7/1999 |
| 2005/0210270 A1 | 9/2005 | Rohatgi et al. | | JP | 11203478 | 7/1999 |
| 2005/0210271 A1 | 9/2005 | Chou et al. | | JP | 11213047 | 8/1999 |
| 2005/0238214 A1 | 10/2005 | Matsuda et al. | | JP | 11339037 | 12/1999 |
| 2005/0240778 A1 | 10/2005 | Saito | | JP | 2000005149 | 1/2000 |
| 2005/0248725 A1 | 11/2005 | Ikoma et al. | | JP | 2000005150 | 1/2000 |
| 2005/0249385 A1 | 11/2005 | Kondo et al. | | JP | 2000011163 | 1/2000 |
| 2005/0255840 A1 | 11/2005 | Markham | | JP | 2000023946 | 1/2000 |
| 2006/0093190 A1 | 5/2006 | Cheng et al. | | JP | 2000083930 | 3/2000 |
| 2006/0147094 A1* | 7/2006 | Yoo | 382/117 | JP | 2000102510 | 4/2000 |
| 2006/0165266 A1 | 7/2006 | Hamza | | JP | 2000102524 | 4/2000 |
| 2006/0274919 A1 | 12/2006 | LoIacono et al. | | JP | 2000105830 | 4/2000 |
| 2007/0036397 A1 | 2/2007 | Hamza | | JP | 2000107156 | 4/2000 |
| 2007/0140531 A1 | 6/2007 | Hamza | | JP | 2000139878 | 5/2000 |
| 2007/0160266 A1 | 7/2007 | Jones et al. | | JP | 2000155863 | 6/2000 |
| 2007/0189582 A1 | 8/2007 | Hamza et al. | | JP | 2000182050 | 6/2000 |
| 2007/0206840 A1 | 9/2007 | Jacobson | | JP | 2000185031 | 7/2000 |
| 2007/0211924 A1 | 9/2007 | Hamza | | JP | 2000194972 | 7/2000 |
| 2007/0274570 A1* | 11/2007 | Hamza | 382/117 | JP | 2000237167 | 9/2000 |
| 2007/0274571 A1 | 11/2007 | Hamza | | JP | 2000242788 | 9/2000 |
| 2007/0286590 A1 | 12/2007 | Terashima | | JP | 2000259817 | 9/2000 |
| 2008/0005578 A1 | 1/2008 | Shafir | | JP | 2000356059 | 12/2000 |
| 2008/0044070 A1* | 2/2008 | Nie | 382/128 | JP | 2000357232 | 12/2000 |
| 2008/0075334 A1 | 3/2008 | Determan et al. | | JP | 2001005948 | 1/2001 |
| 2008/0075441 A1 | 3/2008 | Jelinek et al. | | JP | 2001067399 | 3/2001 |
| 2008/0075445 A1 | 3/2008 | Whillock et al. | | JP | 2001101429 | 4/2001 |
| 2008/0104415 A1 | 5/2008 | Palti-Wasserman et al. | | JP | 2001167275 | 6/2001 |
| 2008/0148030 A1 | 6/2008 | Goffin | | JP | 2001222661 | 8/2001 |
| 2008/0211347 A1 | 9/2008 | Wright et al. | | JP | 2001292981 | 10/2001 |
| 2008/0252412 A1 | 10/2008 | Larsson et al. | | JP | 2001297177 | 10/2001 |
| 2009/0046899 A1 | 2/2009 | Northcott et al. | | JP | 2001358987 | 12/2001 |
| 2009/0092283 A1 | 4/2009 | Whillock et al. | | JP | 2002119477 | 4/2002 |
| 2009/0316993 A1 | 12/2009 | Brasnett et al. | | JP | 2002133415 | 5/2002 |
| 2010/0033677 A1 | 2/2010 | Jelinek | | JP | 2002153444 | 5/2002 |
| 2010/0034529 A1 | 2/2010 | Jelinek | | JP | 2002153445 | 5/2002 |
| 2010/0110374 A1* | 5/2010 | Raguin et al. | 351/206 | JP | 2002260071 | 9/2002 |
| 2010/0182440 A1 | 7/2010 | McCloskey | | JP | 2002271689 | 9/2002 |
| 2010/0239119 A1 | 9/2010 | Bazakos et al. | | JP | 2002286650 | 10/2002 |
| 2011/0150334 A1* | 6/2011 | Du et al. | 382/173 | JP | 2002312772 | 10/2002 |
| | | | | JP | 2002329204 | 11/2002 |
| FOREIGN PATENT DOCUMENTS | | | | JP | 2003006628 | 1/2003 |
| | | | | JP | 2003036434 | 2/2003 |
| EP | 0593386 | 4/1994 | | JP | 2003108720 | 4/2003 |
| EP | 0878780 | 11/1998 | | JP | 2003108983 | 4/2003 |
| EP | 0899680 | 3/1999 | | JP | 2003132355 | 5/2003 |
| EP | 0910986 | 4/1999 | | JP | 2003150942 | 5/2003 |
| EP | 0962894 | 12/1999 | | JP | 2003153880 | 5/2003 |
| EP | 1018297 | 7/2000 | | JP | 2003242125 | 8/2003 |
| EP | 1024463 | 8/2000 | | JP | 2003271565 | 9/2003 |
| EP | 1028398 | 8/2000 | | JP | 2003271940 | 9/2003 |
| EP | 1041506 | 10/2000 | | JP | 2003308522 | 10/2003 |
| EP | 1041523 | 10/2000 | | JP | 2003308523 | 10/2003 |
| EP | 1126403 | 8/2001 | | JP | 2003317102 | 11/2003 |
| EP | 1139270 | 10/2001 | | JP | 2003331265 | 11/2003 |
| EP | 1237117 | 9/2002 | | JP | 2004005167 | 1/2004 |
| EP | 1477925 | 11/2004 | | JP | 2004021406 | 1/2004 |
| EP | 1635307 | 3/2006 | | JP | 2004030334 | 1/2004 |
| GB | 2369205 | 5/2002 | | | | |

| | | |
|---|---|---|
| JP | 2004038305 | 2/2004 |
| JP | 2004094575 | 3/2004 |
| JP | 2004152046 | 5/2004 |
| JP | 2004163356 | 6/2004 |
| JP | 2004164483 | 6/2004 |
| JP | 2004171350 | 6/2004 |
| JP | 2004171602 | 6/2004 |
| JP | 2004206444 | 7/2004 |
| JP | 2004220376 | 8/2004 |
| JP | 2004261515 | 9/2004 |
| JP | 2004280221 | 10/2004 |
| JP | 2004280547 | 10/2004 |
| JP | 2004287621 | 10/2004 |
| JP | 2004315127 | 11/2004 |
| JP | 2004318248 | 11/2004 |
| JP | 2005004524 | 1/2005 |
| JP | 2005011207 | 1/2005 |
| JP | 2005025577 | 1/2005 |
| JP | 2005038257 | 2/2005 |
| JP | 2005062990 | 3/2005 |
| JP | 2005115961 | 4/2005 |
| JP | 2005148883 | 6/2005 |
| JP | 2005242677 | 9/2005 |
| WO | WO 97/17674 | 5/1997 |
| WO | WO 97/21188 | 6/1997 |
| WO | WO 98/02083 | 1/1998 |
| WO | WO 98/08439 | 3/1998 |
| WO | WO 99/32317 | 7/1999 |
| WO | WO 99/52422 | 10/1999 |
| WO | WO 99/65175 | 12/1999 |
| WO | WO 00/28484 | 5/2000 |
| WO | WO 00/29986 | 5/2000 |
| WO | WO 00/31677 | 6/2000 |
| WO | WO 00/36605 | 6/2000 |
| WO | WO 00/62239 | 10/2000 |
| WO | WO 01/01329 | 1/2001 |
| WO | WO 01/03100 | 1/2001 |
| WO | WO 01/28476 | 4/2001 |
| WO | WO 01/35348 | 5/2001 |
| WO | WO 01/35349 | 5/2001 |
| WO | WO 01/40982 | 6/2001 |
| WO | WO 01/63994 | 8/2001 |
| WO | WO 01/69490 | 9/2001 |
| WO | WO 01/86599 | 11/2001 |
| WO | WO 02/01451 | 1/2002 |
| WO | WO 02/19030 | 3/2002 |
| WO | WO 02/35452 | 5/2002 |
| WO | WO 02/35480 | 5/2002 |
| WO | WO 02/091735 | 11/2002 |
| WO | WO 02/095657 | 11/2002 |
| WO | WO 03/002387 | 1/2003 |
| WO | WO 03/003910 | 1/2003 |
| WO | WO 03/054777 | 7/2003 |
| WO | WO 03/077077 | 9/2003 |
| WO | WO 2004/029863 | 4/2004 |
| WO | WO 2004/042646 | 5/2004 |
| WO | WO 2004/055737 | 7/2004 |
| WO | WO 2004/089214 | 10/2004 |
| WO | WO 2004/097743 | 11/2004 |
| WO | WO 2005/008567 | 1/2005 |
| WO | WO 2005/013181 | 2/2005 |
| WO | WO 2005/024698 | 3/2005 |
| WO | WO 2005/024708 | 3/2005 |
| WO | WO 2005/024709 | 3/2005 |
| WO | WO 2005/029388 | 3/2005 |
| WO | WO 2005/062235 | 7/2005 |
| WO | WO 2005/069252 | 7/2005 |
| WO | WO 2005/093510 | 10/2005 |
| WO | WO 2005/093681 | 10/2005 |
| WO | WO 2005/096962 | 10/2005 |
| WO | WO 2005/098531 | 10/2005 |
| WO | WO 2005/104704 | 11/2005 |
| WO | WO 2005/109344 | 11/2005 |
| WO | WO 2006/012645 | 2/2006 |
| WO | WO 2006/023046 | 3/2006 |
| WO | WO 2006/051462 | 5/2006 |
| WO | WO 2006/063076 | 6/2006 |
| WO | WO 2006/081209 | 8/2006 |
| WO | WO 2006/081505 | 8/2006 |
| WO | 2007101269 | 9/2007 |
| WO | WO 2007/101275 | 9/2007 |
| WO | WO 2007/101276 | 9/2007 |
| WO | WO 2007/103698 | 9/2007 |
| WO | WO 2007/103701 | 9/2007 |
| WO | WO 2007/103833 | 9/2007 |
| WO | WO 2007/103834 | 9/2007 |
| WO | WO 2008/016724 | 2/2008 |
| WO | WO 2008/019168 | 2/2008 |
| WO | WO 2008/019169 | 2/2008 |
| WO | WO 2008/021584 | 2/2008 |
| WO | WO 2008/031089 | 3/2008 |
| WO | WO 2008/040026 | 4/2008 |

OTHER PUBLICATIONS

Camus et al., "Reliable and Fast Eye Finding in Close-up Images," IEEE, pp. 389-394, 2002.

Cui et al., "A Fast and Robust Iris Localization Method Based on Texture Segmentation," 8 pages, 2004.

Cui et al., "An Appearance-Based Method for Iris Detection," 6 pages, 2004.

Cui et al., "An Iris Detection Method Based on Structure Information," Advances in Biometric Person Authentication, International Workshop on Biometric Recognition Systems, IWBRS 2005, Beijing China, 10 pages, Oct. 22-23, 2005.

Cui et al., "An Iris Image Synthesis Method Based on PCA and Super-Resolution," IEEE Computer Society, Proceedings of the 17th International Conference on Pattern Recognition, 6 pages, Aug. 23-26, 2004.

Cui et al., "An Iris Recognition Algorithm Using Local Extreme Points," Biometric Authentication, First International Conference, ICBA 2004, Hong Kong, China, 10 pages, Jul. 15-17, 2004.

Daugman, "Results From 200 Billion Iris Cross-Comparisons," University of Cambridge Computer Laboratory, Technical Report, No. 635, 8 pages, Jun. 2005.

Du et al., "A One-Dimensional Approach for Iris Identification," 11 pages, prior to Jan. 25, 2006.

http://www.newscientisttech.com/article/dn11110-invention-covert-iris-sc, "Invention: Covert Iris Scanner," 3 pages, printed Feb. 8, 2007.

Huang et al., "Iris Model Based on Local Orientation Description," 5 pages, prior to Jan. 25, 2006.

Huang et al., "An Efficient Iris Recognition System," IEEE Proceedings of the First International Conference on Machine Learning and Cybernetics, Beijing, pp. 450-454, Nov. 4-5, 2002.

Ma et al., "Personal Identification Based on Iris Texture Analysis," IEEE Transactions on Pattern Analysis and Machine Intelligence, vol. 25, No. 12, pp. 1519-1533, Dec. 2003.

Masek, "Recognition of Human Iris Patterns for Biometric Identification," 61 pages, 2003.

Sun et al., "Robust Encoding of Local Ordinal Measures: A General Framework of Iris Recognition," 13 pages, prior to Jan. 25, 2006.

Avcibas et al., "Steganalysis Using Image Quality Metrics," IEEE Transactions on Image Processing, vol. 12, No. 2, pp. 221-229, Feb. 2003.

Boles, "A Security System Based on Human Iris Identification Using Wavelet Transform," IEEE First International Conference on Knowledge-Based Intelligent Electronic Systems, May 21-23, Adelaide, Australia, pp. 533-541, 1997.

Carson et al., "Blobworld: Image Segmentation Using Expectation-Maximization and Its Application to Image Querying," IEEE Transactions on Pattern Analysis and Machine Intelligence, vol. 24, No. 8, pp. 1026-1038, Aug. 2002.

Daugman, "How Iris Recognition Works," IEEE 2002 International Conference on Image Processing, vol. I of III, 6 pages, Sep. 22-25, 2002.

Guo et al., "A System for Automatic Iris Capturing," Mitsubishi Electric Research Laboratories, Inc., 10 pages, 2005.

Guo, "Face, Expression, and Iris Recognition Using Learning-Based Approaches," 132 pages, 2006.

Jalaja et al., "Texture Element Feature Characterizations for CBIR," IEEE, pp. 733-736, 2005.

Kalka et al., "Image Quality Assessment for Iris Biometric," Proc. of SPIE vol. 6202 62020D, 11 pages, 2006.

Ko et al., "Monitoring and Reporting of Fingerprint Image Quality and Match Accuracy for a Large User Application," IEEE Computer Society, Proceedings of the 33rd Applied Imagery Pattern Recognition Workshop, 6 pages, 2004.

Lau et al., "Finding a Small Number of Regions in an Image Using Low-Level Features," Pattern Recognition 35, pp. 2323-2339, 2002.

Maurer et al., "Tracking and Learning Graphs and Pose on Image Sequences of Faces," IEEE Computer Society Press, International Conference on Automatic Face and Gesture Recognition, pp. 176-181, Oct. 14-16, 1996.

Oppenheim et al, "The Importance of Phase in Signals," Proceedings of the IEEE, vol. 69, No. 5, pp. 529-541, 1981.

Ratha et al., "A Real-Time Matching System for Large Fingerprint Databases," IEEE Transactions on Pattern Analysis, and Machine Intelligence, vol. 18, No. 8, pp. 799-812, Aug. 1996.

Sony, "Network Color Camera, SNC-RZ30N (NTSC)," 6 pages, Aug. 2002.

Wang et al, "Image Quality Assessment: From Error Visibility to Structural Similarity," IEEE Transactions on Image Processing, vol. 13, No. 4, pp. 600-612, Apr. 2004.

Wang et al., "A Universal Image Quality Index," IEEE Signal Processing Letters, vol. 9, No. 3, pp. 81-84, Mar. 2002.

Wang et al., "Local Phase Coherence and the Perception of Blur," Advances in Nueral Information Processing Systems 16, pp. 1435-1442, 2004.

AOptix Technologies, "Introducing the AOptix InSight 2 Meter Iris Recognition System," 6 pages, 2010.

Belhumeur et al., "Eigenfaces Vs. Fisherfaces: Recognition Using Class Specific Linear Projection," 14 pages, prior to Jun. 11, 2010.

Bentley et al., "Multidimensional Binary Search Trees Used for Associative Searching," Communications of the ACM, vol. 18, No. 9, pp. 509-517, Sep. 1975.

Blackman et al., "Chapter 9, Multiple Sensor Tracking: Issues and Methods," Design and Analysis of Modern Tracking Systems, Artech House, pp. 595-659, 1999.

Brasnett et al., "A Robust Visual Identifier Using the Trace Transform," 6 pages, prior to Jun. 11, 2010.

Buades et al., "A Review of Image Denoising Algorithms, with a New One," Multiscale Modeling & Simulation, vol. 4, No. 2, pp. 490-530, 2005.

Chen et al., "Localized Iris Image Quality Using 2-D Wavelets," LNCS vol. 3832, pp. 373-381, 2005.

Chow et al., "Towards a System for Automatic Facial Feature Detection," Pattern Recognition vol. 26, No. 12, pp. 1739-1755, 1993.

U.S. Appl. No. 12/792,498, filed Jun. 2, 2010.

U.S. Appl. No. 12/814,232, filed Jun. 11, 2010.

U.S. Appl. No. 12/814,272, filed Jun. 11, 2010.

Cula et al., "Bidirectional Imaging and Modeling of Skin Texture," Proceedings of Texture 2003, 6 pages, Oct. 17, 2003.

Cula et al., "Bidirectional Imaging and Modeling of Skin Texture," IEEE Transactions on Biomedical Engineering, vol. 51, No. 12, pp. 2148-2159, 2004.

Cula et al., "Compact Representation of Bidirectional Texture Functions," Proceedings of IEEE Computer Society Conference on Computer Vision and Pattern Recognition 2001, 8 pages, 2001.

Cula et al., "Skin Texture Modeling," International Journal of Computer Vision 2004, 34 pages, 2004.

Dabov et al., "Image Denoising by Sparse 3-D Transform-Domain Collaborative Filtering," IEEE Transactions on Image Processing, vol. 16, No. 8, pp. 2080-2095, Aug. 2007.

Dabov et al., "Image Restoration by Spars 3D Transform Collaborative Filtering," SPIE vol. 6812 681207-1, 12 pages, 2008.

Daugman, "High Confidence Visual Recognition of Persons by a Test of Statistical Independence," IEEE Transactions on Pattern Analysis and Machine Intelligence, vol. 15, No. 11, pp. 1148-1161, 1993.

Daugman, "Probing the Uniqueness and Randomness of Iris Codes: Results from 200 Billion Iris Pair Comparisons," Proceedings of the IEEE vol. 94, No. 11, pp. 1928-1935, Nov. 2006.

Fooprateepsiri et al., "A Highly Robust Method for Face Authentication," IEEE 2009 First Asian Conference on Intelligent Information and Database Systems, pp. 380-385, 2009.

Fooprateepsiri et al., "Face Verification Base-On Hausdorff-Shape Context," IEEE 2009 Asia Conference on Informatics in Control, Automation and Robotics, pp. 240-244, 2009.

Forstner et al., "A Metric for Covariance Matrices," 16 pages, prior to Jun. 11, 2010.

Gan et al., "Applications of Wavelet Packets Decomposition in Iris Recognition," LNCS vol. 3832, pp. 443-449, 2005.

Hampapur et al., "Smart Surveillance: Applications, Technologies and Implications," IEEE, 6 pages, Dec. 15-18, 2003.

Hamza et al., "Standoff Iris Recognition Usin Non-Iterative Polar Based Segmentation," Proceedings of SPIE vol. 6944, 8 pages, 2008.

Hanna et al., "A System for Non-Intrusive Human Iris Acquisition and Identification," IAPR Workshop on Machine Vision Applications, pp. 200-203, Nov. 12-14, 1996.

http://en.wikipedia.org/wiki/Radon_transform, "Radon Transform," 5 pages, printed May 14, 2010.

Ivins et al., "A Deformable Model of the Human Iris for Measuring Small Three-Dimensional Eye Movements," Machine Vision and Applications, vol. 11, pp. 42-51, 1998.

Kadyrov et al., "The Trace Transform and Its Applications," IEEE Transactions on Pattern Analysis and Machine Intelligence, vol. 23, No. 8, pp. 811-828, Aug. 2001.

Kadyrov et al., "The Trace Transform as a Tool to Invariant Feature Construction," 3 pages, prior to Jun. 11, 2010.

Kang et al., "Improved Dual Action Contour for Iris Recognition," 10 pages, prior to Jun. 11, 2010.

Kawaguchi et al., "Detection of Eyes from Human Faces by Hough Transform and Separability Filter," IEEE, 4 pages, 2000.

Kong et al., "Detecting Eyelash and Reflection for Accurate Iris Segmentation," International Journal of Pattern Recognition and Artificial Intelligence, vol. 17, No. 6, pp. 1025-1034, 2003.

Li et al., "Appearance Modeling Using a Geometric Transform," IEEE Transactions on Image Processing, 17 pages, 2008.

Li et al., "Appearance Modeling Using a Geometric Transform," Journal Preparation for IEEE Transactions on Image Processing, 30 pages, Nov. 5, 2006.

Ma et al., "Local Intensity Variation Analysis for Iris Recognition," Pattern Recognition, vol. 37, pp. 1287-1298, 2004.

Ma et al., "Video Sequence Querying Using Clustering of Objects' Appearance Models," Advances in Visual Computing Third Annual Symposium, ISVC 2007, 14 pages, 2007.

Monro et al., "DCT-Based Iris Recognition," IEEE Transactions on Pattern Analysis and Machine Intelligence, vol. 29, No. 4, Apr. 2007.

Noh et al., "A Novel Method to Extract Features for Iris Recognition System," AVBPA 2003, LNCS 2688, pp. 862-868, 2003.

Ojala et al., "Multiresolution Gray-Scale and Rotation Invariant Texture Classification with Local Binary Patterns," IEEE Transactions on Pattern Analysis and Machine Intelligence, vol. 24, No. 7, 18 pages, Jul. 2002.

Pamudurthy et al., "Dynamic Approach for Face Recognition Using Digital Image Skin Correlation," Audio and Video Based Person Authentication 5th International Conference, AVBPA 2005, Hilton Rye Town, NY, USA, 11 pages, Jul. 20-22, 2005.

Petrou et al., "The Trace Transform in a Nutshell," 9 pages, prior to Jun. 11, 2010.

Phillips et al., "FRVT 2006 and ICE 2006 Large-Scale Results," 56 pages, Mar. 2007.

Porikli et al., "Covariance Tracking Using Model Update Based on Means on Riemannian Manifolds," 8 pages, prior to Jun. 11, 2010.

Proenca et al., "Toward Noncooperative Iris Recognition: A Classification Approach Using Multiple Signatures," IEEE Transactions on Patern Analysis and Machine Intellingence, vol. 29, No. 4, pp. 607-612, Apr. 2007.

Ross et al., "Segmenting Non-Ideal Irises Using Geodesic Active Contours," IEEE 2006 Biometrics Symposium, 3 pages, 2006.

Shapiro et al., pp. 556-559 in Book Entitled "Computer Vision," Prentice Hall, prior to Jun. 11, 2010.

Stillman et al., "A System for Tracking and Recognizing Multiple People with Multiple Cameras," 6 pages, Aug. 1998.

Sun et al., "Iris Recognition Based on Non-local Comparisons," Sinobiometrics 2004, LNCS 3338, pp. 67-77, 2004.

Suzaki et al., "A Horse Identification System Using Biometrics," Systems and Computer in Japan, vol. 32, No. 14, pp. 12-23, 2001.

Trucco et al., "Robust Iris Location in Close-up Images of the Eye," Pattern Anal. Applic. vol. 8, pp. 247-255, 2005.

Turan et al., "Trace Transform Based Invariant Object Recognition System," 4 pages, prior to Jun. 11, 2010.

Turk et al., "Eigenfaces for Recognition," Journal of Cognitive Neuroscience, vol. 3, No. 1, 16 pages, 1991.

Wang et al., "Recent Developments in Human Motion Analysis," Pattern Recognition, vol. 36, pp. 585-601, 2003.

Wei et al., "Robust and Fast Assessment of Iris Image Quality," LNCS vol. 3832, pp. 464-471, 2005.

Zhao et al., "Dynamic Texture Recognition Using Local Binary Patterns with an Application to Facial Expressions," IEEE Transactions on Pattern Analysis and Machine Intelligence, vol. 29, No. 6, pp. 915-928, Jun. 2007.

Zhi-Hui et al., "Research Iris Serial Images Quality Assessment Method Based on HVS," Proceedings of SPIE, vol. 6034, 6 pages, 2006.

U.S. Appl. No. 13/077,821, filed Mar. 30, 2011.

Freeboy, "Adaptive Optics Speeds Up Airport Immigration," Optics. org/ole, 2 pages, Jan. 2009.

http://www.imagine-eyes.com/content/view/100/115/, "INOVEO—Ultra-High Resolution Retinal Imaging with Adaptive Optics," 2 pages, printed Feb. 22, 2010.

\* cited by examiner $$\text{Scharr filter} = \begin{vmatrix} -3 & 0 & 3 \\ -10 & 0 & 10 \\ -3 & 0 & 3 \end{vmatrix}$$

IRIS RECOGNITION SYSTEM USING QUALITY METRICS

BACKGROUND

The present invention pertains to biometrics and particularly to identification of persons using biometrics. More particularly, the invention refers to identification via eye images.

SUMMARY

The invention is an iris recognition system using iris quality metrics on acquired eye images.

BRIEF DESCRIPTION OF THE DRAWING

FIGS. 3a, 3b, 3c and 4 are diagrams for image blur assessment;

DESCRIPTION

Figure 1:
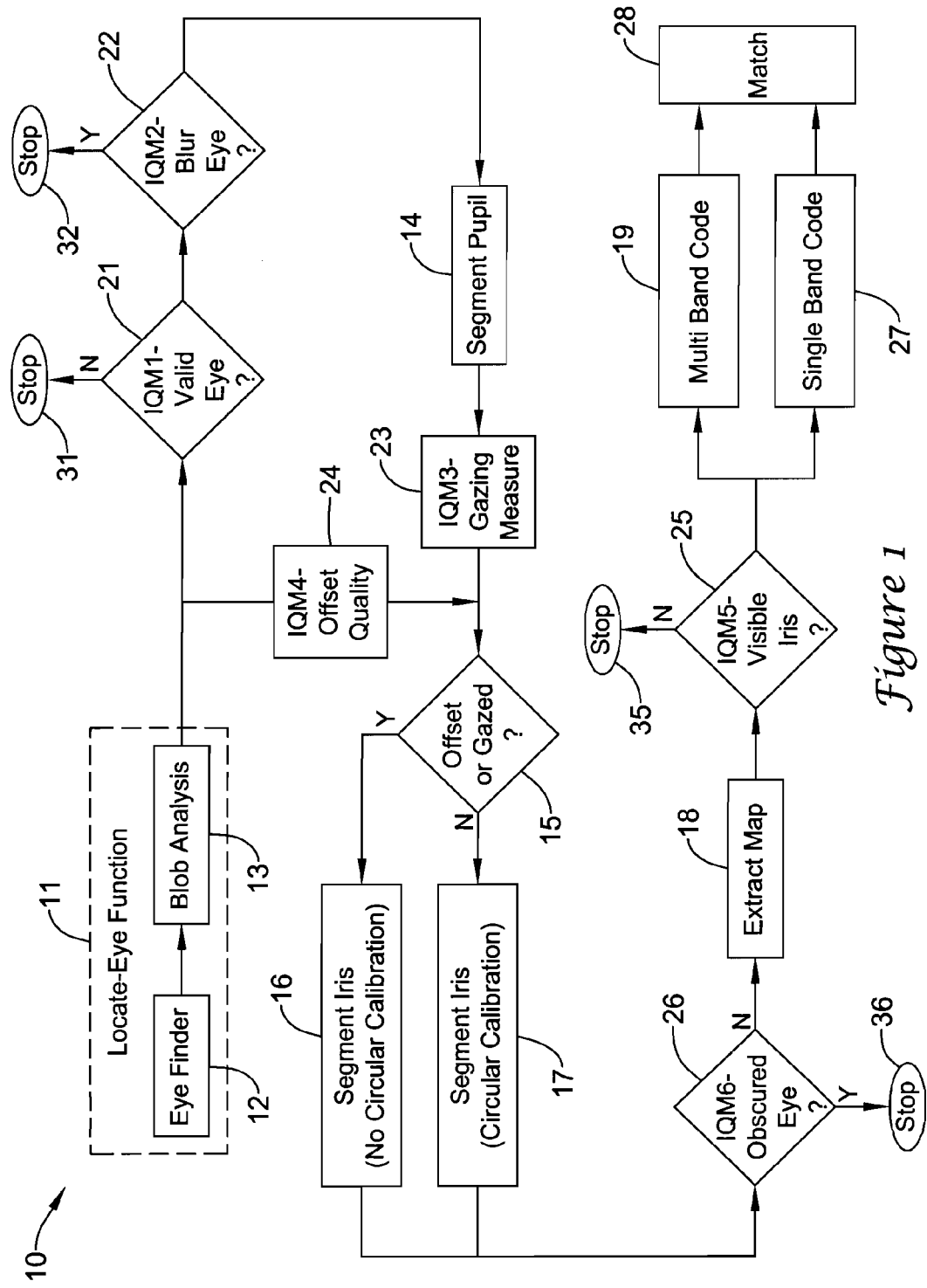
FIG. 1 is a diagram of the architecture of the present image analysis system.

The present invention may include methods and apparatus for developing quantitative measures that can automatically assess the quality of iris images before being processed for iris recognition.

Digital eye images are often subject to a wide variety of distortions during acquisitions, transmission and reproduction any of which may result in degradation of iris recognition performance.

Several patent applications may be relevant to the present invention. U.S. patent application Ser. No. 10/979,129, filed Nov. 3, 2004, is hereby incorporated by reference. U.S. patent application Ser. No. 11/275,703 filed Jan. 25, 2006, is hereby incorporated by reference. U.S. patent application Ser. No. 11/372,854, filed Mar. 10, 2006, is hereby incorporated by reference. U.S. patent application Ser. No. 11/681,614, filed Mar. 2, 2007, is hereby incorporated by reference. U.S. patent application Ser. No. 11/043,366, filed Jan. 26, 2005, is hereby incorporated by reference. U.S. patent application Ser. No. 10/655,124, filed Sep. 5, 2003, is hereby incorporated by reference. U.S. patent application Ser. No. 11/672,108, filed Feb. 7, 2007, is hereby incorporated by reference. U.S. patent application Ser. No. 11/681,751, filed Mar. 2, 2007, is hereby incorporated by reference. U.S. patent application Ser. No. 11/681,662, filed Mar. 2, 2007, is hereby incorporated by reference. U.S. patent application Ser. No. 11/675,424, filed Feb. 15, 2007, is hereby incorporated by reference. U.S. patent application Ser. No. 11/382,373, filed May 9, 2006, is hereby incorporated by reference.

The present invention may include an implementation of a set of appropriate quantitative iris image quality metrics (IQM's). The IQM's may be defined on the basis of image features based on the acquisition performance. The quality of the image should correlate well with subjective iris processes.

The IQM's may be integrated into a processing procedure to assess the quality of the iris image before and through out the iris recognition process. Based upon the evaluation of these metrics, a case based reasoning (CBR) approach may be executed to process the iris image based upon its quality.

It appears desirable to assess the quality of an eye image in real-time as a quality control procedure. This may allow poor image acquisition to be corrected through recapture and facilitate acquisition of the best possible image within the capture time window configured in the system. This may result in a process of more good quality iris images that can improve the iris identification accuracy and the integrity of iris recognition systems. A perfectly captured iris pattern under ideal conditions would illustrate clearly the texture of an iris that can be captured in a unique iris barcode. However, many factors such eye closure, obscuration, off-angle eyes, occlusions, and imperfect acquisition embedded in electronic noise, non-uniform illumination, different sensor wavelength sensitivity, pupil dilation, and specular light reflections, may cause the captured iris map to be far from having ideal quality. Smearing, blurring, defocus and poor resolution may result in the capture of very poor quality images as that will have a negative impact on even iris segmentation and/or feature extraction.

The present metrics may be used to improve upon the iris recognition using quadrant based analysis (starting from sclera edges to lid edges) and to extract iris features in constructing the iris polar map based upon the computed IQM's of the digital iris image. Based upon the amount of the artifacts, from obscuration, occlusion, or blurring or other effects, a process may be applied based upon the case based (CBR) reasoning approach.

IQM1 through IQM6 may be defined herein. IQM1 is eye validation. Eye validation may be assessed using the pupil edges (i.e., inner border of the iris) and determining how they fit to an elliptic model. One may analyze the model fitting into multi-stages where the edges are analyzed against an elliptic fit, and then to a circular fit. If either model fails, presumably because of an obscured eye, one may mask the upper lids and re-assess only the sclera and bottom lids against a model fit. The displacement of the curve from the model may be a measure of the quality of the eye.

IQM2 is blur amount. Properties of a neighborhood pixel distribution may be considered using a gradient of the iris texture. By assumption, the isotropic derivative of an image may show located edges at the borders of the iris consistently regardless of image quality (blur or focused images), which means a quantified amount of edges are expected to be in the image gradient as a function of the expected range of at least the inner border of the iris. The method of locating other edges is characteristic of the "gradient filter" family of edge detection filters. So for non-blur images, one may expect additional detected edges which exceed the amount associated with the inner borders. Thus, an image may be declared non-blur if the value of the cumulative sum of the gradient exceeds the expected range of the inner border of the iris.

There may be several scores for quality and matching. One is quality (Q1) relating to the query which should be 100 percent. Another is quality (Q2) of the probe or image. Still another score (M) is a matching score. The two scores, Q2 and M, are the scores which may be used in the present approach. IQMs 1, 2, 5 and 6 may be relevant to decision making in matching subjects and be used to tailor difference processes for different acquisition scenarios.

IQM3 may be an off angle or gazing measure of an eye in an image. The off angle may be assessed in an iris outer boundary shape fitting. One may measure the ratio between the major and minor axis of the elliptic fit of the pupil which can be a good indicator of the off angle or gazing of the eye.

IQM4 is a simple test of the location of the eye within the eye image. If the eye is close to the edges of the image by at least the expected maximum size of an iris radius, it can be considered an offset eye as it may not contain the entire bounds of the iris.

IQM5 is an amount of iris exposure within the iris map. IQM6 is similar to IQM1 but is applied to the outer border of the iris rather than the inner border.

The logical flow of processes may be influenced by the quality of the iris. An architecture design of the solution using the IQM's is described herein. Several procedures of the invention may be implemented with an algorithm. The segmentation analysis may be reconfigured based upon a quadrant approach where one uses a POSE (polar segmentation) technique (U.S. patent application Ser. No. 11/043,366, filed Jan. 26, 2005). The POSE type segmentation may start at the sclera edges and expand the edge detection to the lids quadrants (obscured areas). In the presence of obscuration (detected using the discontinuity in the derivative of the edge curve at the lid quadrants), one may mask the iris map accordingly based upon the amount of obscurations. Two selective operations may be defined. One is to mask the lid region entirely for heavy obscuration. Another is, for partial obscuration, to use the two breaking points of the discontinuity on the curve to interpolate a linear curve and extract just the iris pixels contained between the constructed line and pupil borders while masking the region outward the curve.

One may also model the iris map intensity using normal distributions to identify any outliers that do not fit the iris profile. The procedure may detect any artifacts due to reflection and or to some missed edges in the segmentation process.

To extend to at-a-distance applications, some of the algorithm procedures may require exhaustive processes which include Hough transforms. Some issues with a Hough method may include requiring threshold values to be chosen for edge detection, which may result into critical information (e.g., edge points) being removed/missed, and thus resulting in a failure to detect the iris or pupil regions.

FIG. 1 is a diagram of the architecture of the present invention or system 10. The first item is a locate-eye function block 11 which contains an eye finder 12. Upon finding an eye, the finder 12 may output the eye image to a blob analysis unit 13. The results of the blob analysis may be evaluated with IQM's for parameter estimates to stage the parameter ranges.

IQM1 may be indicated whether there the image has a valid eye at symbol 21. IQM1 is described in FIG. 2 and corresponding text hereon. If the capture of the eye in not deemed valid, the process might stop as symbol 31. If valid, then the eye image may go to symbol 22 for a blur measure according an IQM2, as described in FIGS. 3 and 4, and corresponding text herein. If the results of IQM2 at symbol 22 relative to a blur measure are not good, then the process may stop at symbol 32. If the results of IQM2 evaluation at symbol 22 are acceptable, then the pupil may be a segmented at block 14. After block 14, a gazed eye measure may be made at item 23 in view of an IQM3. Also, an eye may from the blob analysis unit 13 may to go an offset or shifted eye block 24 for an eye offset or shift measurement according to IQM4. IQM3 and IQM4 are described in FIG. 5 and corresponding text herein. The eye offset measurement from block 24 may be joined with the output of gazed eye measurement from block 23. These outputs may go to symbol 15 where a question whether the eye of the image is offset or gazed. If the eye is offset or gazed, then the iris may be segmented with no-circular calibration at block 16. If the eye is not offset or gazed, then the iris may be segmented with circular calibration at block 17.

Figure 6A:
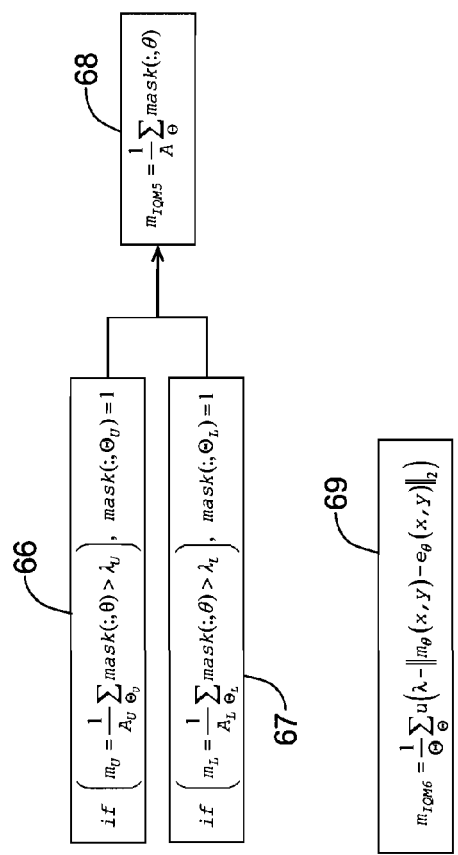
FIGS. 6a and 6b show information and a diagram relative to eye obscuration.
Figure 6B:
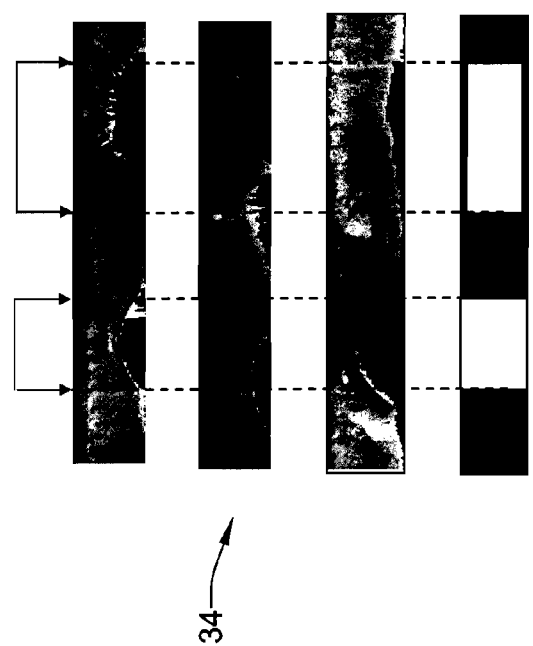

The segment iris at the output of block 16 or 17 may go to a symbol that checks whether the eye or iris is obscured according to IQM6, as shown in FIG. 6 and corresponding text herein. If the result of symbol 26 is not acceptable, then the process may stop at symbol 36. If it is acceptable, then the eye or iris image may go to a block 18 where a map of the iris may be extracted. From block 18, the resultant map image may go to a symbol 25 where a visibility measure is made according to IQM5, as shown in FIGS. 6a and 6b and corresponding text herein. If the measure is not acceptable, the process may stop at symbol 35. If acceptable, then a multi-band code may be made of the iris at block 19. Also a single band-code may be made at block 27. Either or both codes from blocks 19 and 27 may go to a block 28 for a match to identify the iris and indicate possibly the identity of the person associated with the iris. Also, the one or both codes may be indexed and stored in a database for future use, such as identification.

Figure 2:
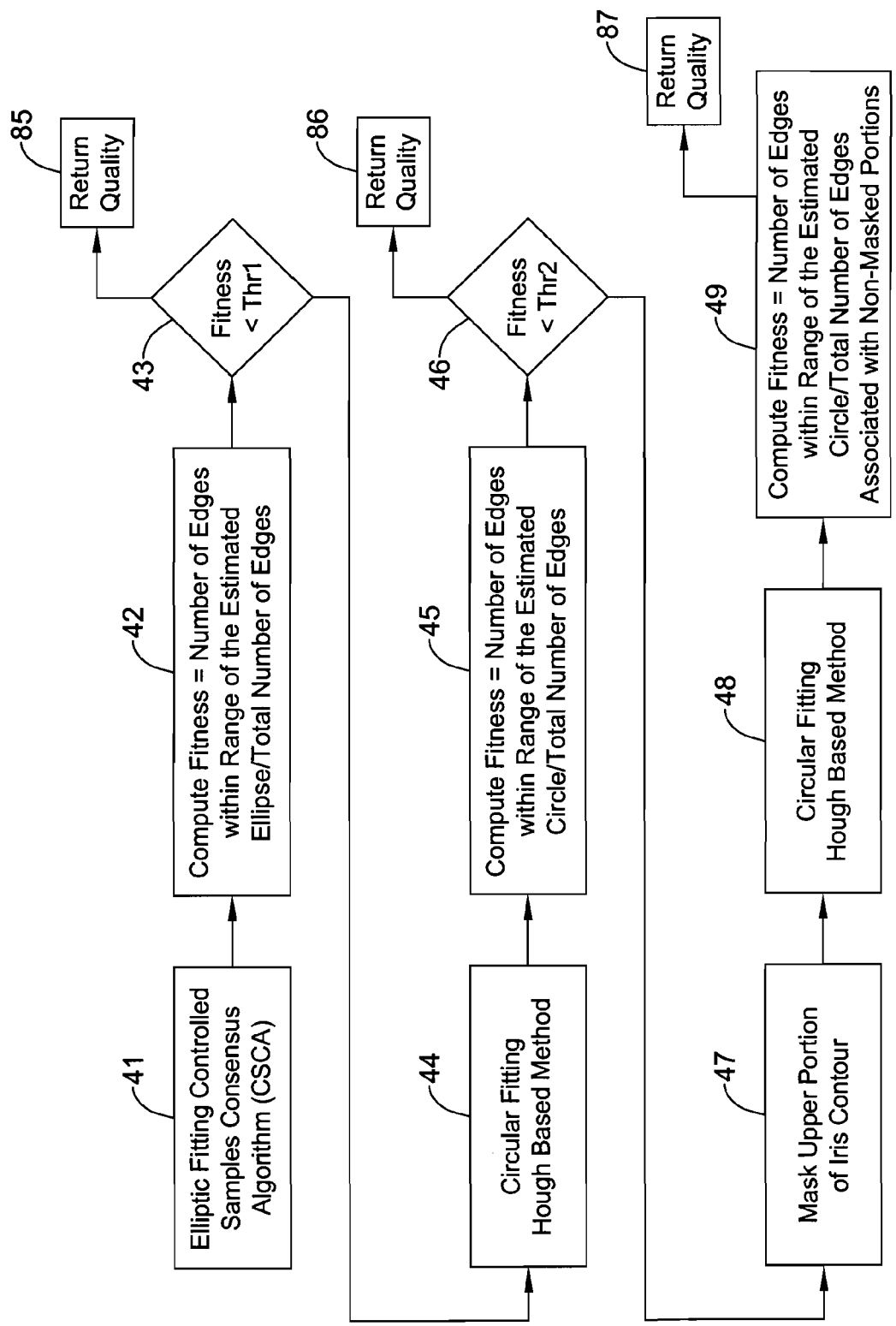
FIG. 2 is a diagram for eye image validation.

IQM1 for eye validation, as shown in FIG. 2, may begin with an elliptic fitting having a controlled samples consensus algorithm (CSCA) at block 41. Following block 41, the fitness may be computed as a number of edges within a range of the estimated ellipse/total number of edges at block 42. The fitness may be checked at symbol 43 to note that it is less than THR1. If not, stop process and return quality 85.

Circular fitting on a Hough-based method may be implemented on the iris at block 44. The fitness may be computed as a number of edges within a range of the estimated circle/total number of edges at block 45. The fitness may be checked to see that it is less than THR2 at symbol 46. If not, then stop process and return quality 86. After symbol 46, an upper portion of the iris contour may be masked at block 47. Circular fitting may be done with the Hough-based method at block 48. At block 49, fitness may be computed as a number of edges within a range of the estimated circle/total number of non-masked regions or portions edges. One may go to return quality 87.

It may be noted that at least four combinations can be used to fit an elliptic model using the guided CSSA algorithm as a modification to random consensus algorithm and replacement of Hough transform. They include the sclera only, sclera plus the lower lid, the entire contour, and the lower portion of the contour.

Figure 3A:
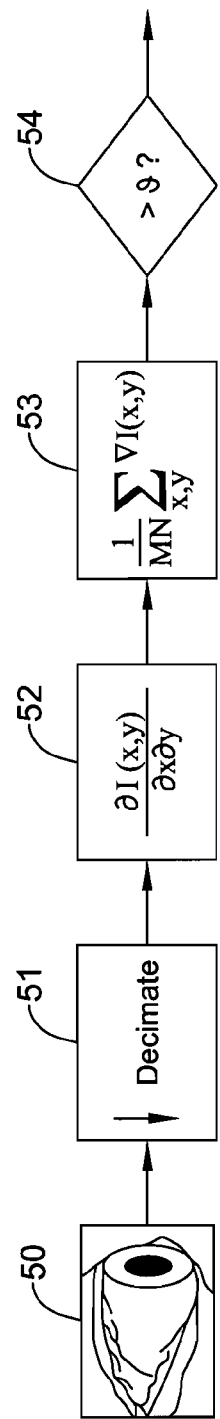
Figure 3B:
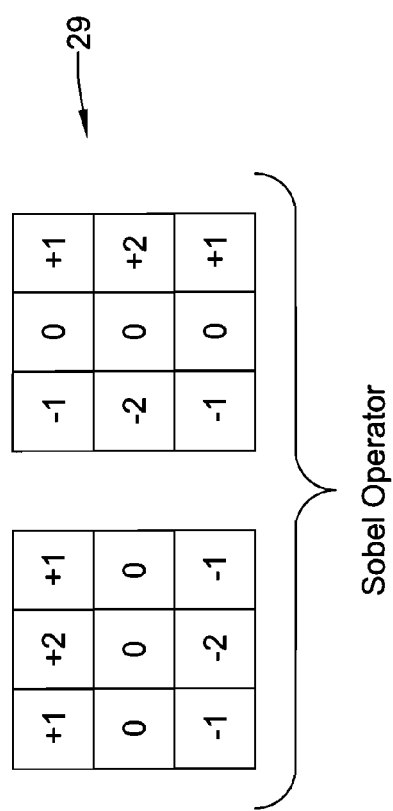

FIG. 3a is an outline of the IQM2 image blur assessment or measure. An eye image 50 may go to a block 51 to be decimated at, for instance, M×N=120×160. An operator may be applied to the decimated image at block 52. An example may be a Sobel operator 29 shown in FIG. 3b. An output after an application of the operator may go to a gradient equation at block 53, such as for example a Scharr filter 33 shown in FIG. 3c. The value of the output of block 53 should have a value greater than "θ" as indicated at symbol 54 to be acceptable.

A basic concept of the image blur assessment or measure IMQ2 may be noted in conjunction with a pixel distribution. Properties of a neighborhood pixel distribution may be considered using a gradient of the overall acquired image. The isotropic derivative operator on the image may show located edges at the borders of an iris consistently regardless of image quality (e.g., blur or focused images), which means that a quantified amount of edges is expected to be in the image gradient. For instance, $\theta=(2\pi(R_{in}+R_{out}))/(M\times N)$. In the present example, $\theta=(2\pi(18+38))/(120\times160)\approx0.018$. However, a value smaller than this estimate may be deemed as a blur image, and any value comparable or higher than this number may be deemed to be non-blur. This approach or method of locating other edges may appear characteristic of the "gradient filter" family of edge detection filters and includes an operator. Thus, for non-blur images, one may expect additional detected edges that exceed the amount computed for θ. An image may be declared a blur if the value of the cumulative sum of the gradient exceeds the computed threshold θ.

Figure 4:
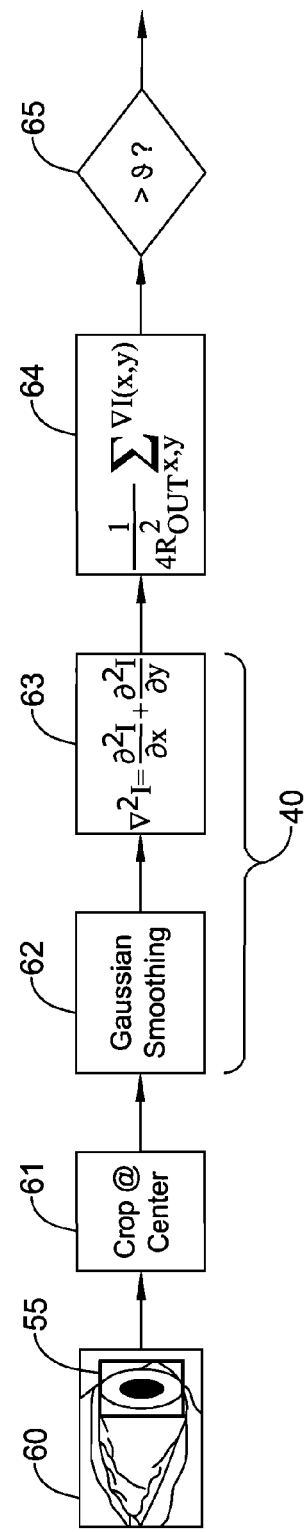

Another concept of the image blur assessment or measure IMQ2 may be noted in conjunction with FIG. 4. A zero crossing may be applied to find edges at all directions. A Laplacian approach may find edges regardless of orientation. One may look for a zero-crossing second derivative, that is, a Laplacian approach may be applied using a derivative for $1^{st}$-derivative extrema. It may be a Laplacian of the Gaussian (LOG) (linear and isotropic), $$LoG_\sigma = -(1/(\pi\sigma^4))(1-(x^2+y^2/2\sigma^2))e^{-((x^2+y^2)/2\sigma^2)}.$$

Thus, one may search for the zero crossings of a Gaussian smoothed image with an operator 40. An example of an operator 40 may be a Marr-Hildreth one.

An image 60 of an eye may be provided to a block 61 for a crop at center, as indicated by a rectangle 55 of image 60 and with a formula $(2R_{out}) \times (2R_{out})$. The cropped image encompassing the iris of the eye may go to blocks 62 and 63 for Gaussian smoothing and application of a formula, for example, $$\nabla^2 I = \frac{\partial^2 I}{\partial x} + \frac{\partial^2 I}{\partial y},$$

which together constitute the operator 40. The operator should preserve the texture of the image. Another formula may suffice for block 63. The output from block 63 may to a block 64 for a filtering or evaluation with a formula, for example, $$\frac{1}{4R_{OUT}^2} \sum_{x,y} \nabla I(x, y).$$

Another formula may suffice for block 64. The output of block 64 may be checked at symbol 65 to see whether it exceeds "θ", where $\theta = (\pi(R_{in}+R_{out}))/2R_{out}$.

Figure 5:
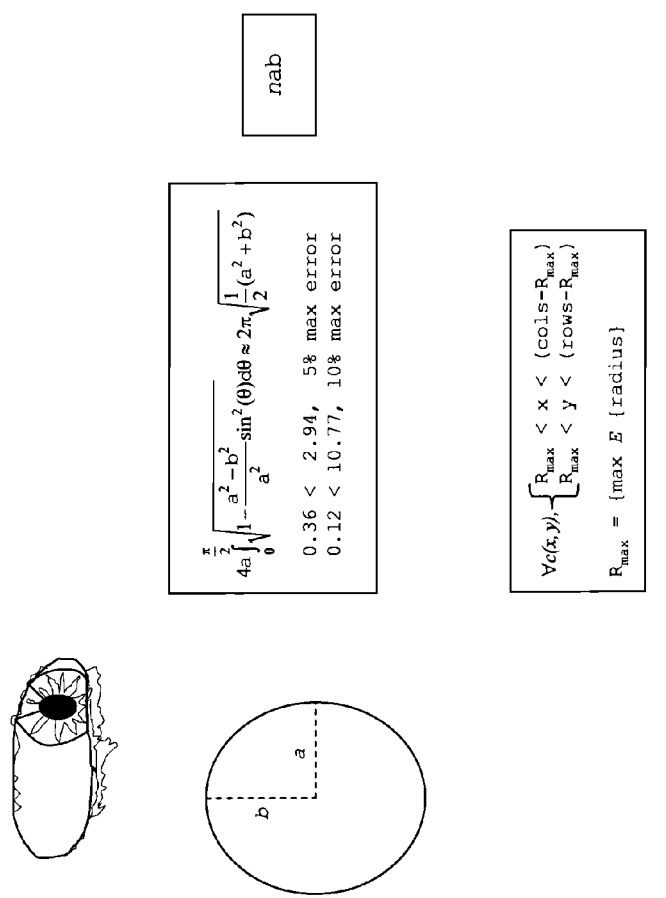
FIG. 5 shows a diagram and information for eye gazing and offset determinations.

Eye gazing and offset may be evaluated in accordance with IQM3 and IQM4, respectively. Items of FIG. 5 illustrate such evaluation. A measurement may be made to assess the deformation of the iris perspective projection. The dimensions of the iris may be "b" (minor axis) and "a" (major axis), for instance a measurement of the outer bound in a direction along the y axis and in a direction along the x axis, respectively, as indicated by item 56. The measurement for deformation assessment may be indicated by a formula in box 57. The gazing deformation can be estimated using an approximation as being indicated by a formula. An applicable formula may be $$4a \int_0^{\frac{\pi}{2}} \sqrt{1 - \frac{a^2-b^2}{a^2}\sin^2(\theta)}\, d\theta,$$

which may be approximated by formula, $$2\pi \sqrt{\frac{1}{2}(a^2+b^2)}.$$

Computing the surface of the inner bound may be another approach. For an aspect ratio of 0.36<(b/a)<2.94, the maximum error should be about 5 percent. For an aspect ratio of 0.12<(b/a)<10.77, the maximum error should be about 10 percent. A rough estimation of area may be indicated by "πab" in box 58. A calculation relative to offset can be computed by validating the center of the model C(x,y) such as the Rmax of the model satisfies the formulas in box 59, which are $$\forall c(x, y), \begin{cases} R_{max} < x < (cols - R_{max}) \\ R_{max} < y < (rows - R_{max}) \end{cases}, \text{ and}$$

c may be the center and Rmax=max expected value of the radius of the estimated model (E[radius]). If one measures the outer bound from the center of the iris along the x axis, and the distance in the x direction is less than the maximum radius of the outer bound $R_{max}$, then there may be an offset.

The visibility measure according to IQM5 and obscuration measure according to IQM6 are shown in FIG. 6a. The outer boundary of the iris may be fitted into a model. A fitness measure is how good the model may fit the curve of the boundary. It the conditional statements 66 and 67 are met, then the statement 68 for an IQM5 visibility measurement may follow. Statement 66 is $$\text{if } \left( m_U = \frac{1}{A_U} \sum_{\Theta_U} \text{mask}(:, \theta) > \lambda_U \right), \text{mask}(:, \Theta_U) = 1$$

and statement 67 is $$\text{if } \left( m_L = \frac{1}{A_L} \sum_{\Theta_L} \text{mask}(:, \theta) > \lambda_L \right), \text{mask}(:, \Theta_L) = 1$$

Statement 68 is $$m_{IQM5} = \frac{1}{A} \sum_{\Theta} \text{mask}(:, \theta)$$

A statement 69 for an IQM6 measurement is $$m_{IQM6} = \frac{1}{\Theta} \sum_{\Theta} u(\lambda - \|m_\theta(x, y) - e_\theta(x, y)\|_2)$$

FIG. 6b shows maps 34, and portions that should be masked to eliminate noise.

Figure 7A:
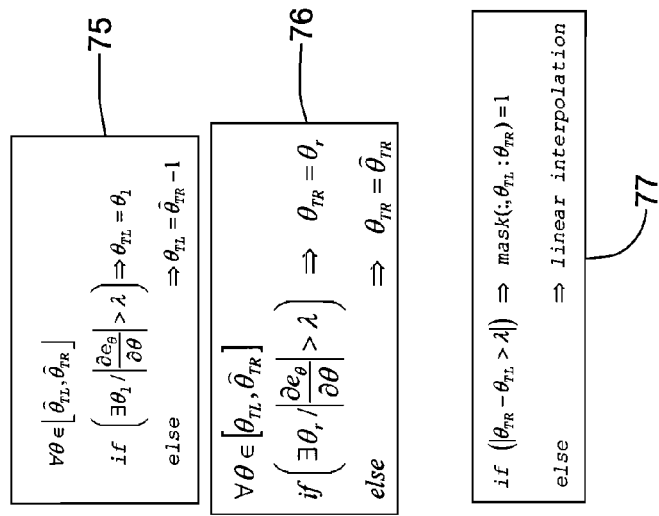
FIGS. 7a and 7b show information and a diagram pertaining to quadrant based iris segmentation analysis.
Figure 7B:
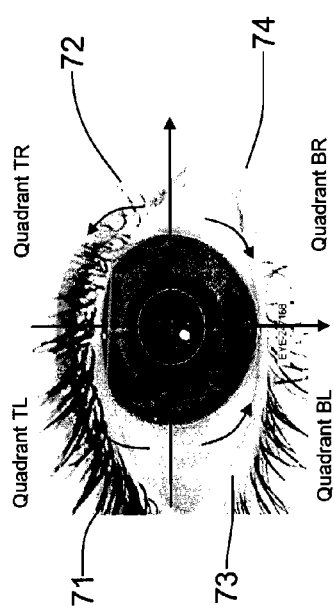

FIGS. 7a and 7b provide an approach for quadrant iris analysis, that is, an analysis quadrant by quadrant. Step 1 may include finding limits on the top left quadrant 71. One may start from the sclera at an x axis, clockwise, and proceed to a break point at an obscuration or discontinuity, if any. If there is no obscuration, discontinuity or the like, then a break point may be defined between the first and second quadrants (i.e., upper left and right quadrants). Such defined break may be about 90 degrees or so clockwise from the 0 degree point at the x-axis in the first quadrant or about 90 degrees counter-clockwise from the 180 degree point from the x-axis in the second quadrant.

The statements in box 75 may be used for quadrant analysis as indicated herein.

$$\forall \theta \in \left[\hat{\theta}_{TL}, \hat{\theta}_{TR}\right]$$

$$\text{if } \left(\exists \theta_l \Big/ \left|\frac{\partial e_\theta}{\partial \theta}\right| > \lambda\right) \Rightarrow \theta_{TL} = \theta_l$$

$$\text{else } \Rightarrow \theta_{TL} = \hat{\theta}_{TR} - 1.$$

Step 2 may include finding limits of the top right quadrant 72. One may start from the sclera, counterclockwise. If there is no obscuration, discontinuity or the like, then a break point may be defined between the first and second quadrants as noted in step 1. If there is no obscuration, discontinuity or the like, then a break point may be defined between the first and second quadrants. The statements in box 76 may be used as indicated herein.

$$\forall \theta \in \left[\hat{\theta}_{TL}, \hat{\theta}_{TR}\right]$$

$$\text{if } \left(\exists \theta_r \Big/ \left|\frac{\partial e_\theta}{\partial \theta}\right| > \lambda\right) \Rightarrow \theta_{TR} = \theta_r$$

$$\text{else } \Rightarrow \theta_{TR} = \hat{\theta}_{TR}.$$

Step 3 may include an interpolation/mask test. The statements as stated in box 77 may be used as indicated herein.

if $(|\theta_{TR} - \theta_{TL}\lambda'|) \Rightarrow \text{mask}(:,\theta_{TL}:\theta_{TR}) = 1$ else $\Rightarrow$ linear interpolation Steps 4 and 5 use the same statements as steps 1 and 2 except quadrants TL 71 and TR 72 may be substituted with quadrants BL 73 and BR 74, respectively. The same substitution may apply for step 6 in lieu of step 3. Full segmentation (i.e., no masking) may be used. Full segmentation is equivalent to a single point interpolation.

One may start at 0 degrees with respect to the x axis (x-axis may change based upon head tilting and is always assumed to be the normal of the head orientation, that passes by the two eye centers; y-axis is the normal direction of the x-axis that defines the head orientation) in the left quadrant and move out to a break point. When the break point is encountered, then that portion of the quadrant may become TL. Generally the break point will be a discontinuity such as an eyelash. If there is no break point, the edges of POSE are preserved (as good edges) and process is completed toward specified limits. The low left and right quadrants may be handled similarly.

In the quadrant pairs TL and TR and BL and BR, the break points may not exist in case of an open eye with no eye lid obscurations. The POSE edges are applicable as captured by original algorithm POSE. An obscuration between the break points may determine an angle between the break points. An angle $\theta_o$ may be determined as an interpolation, i.e., a line between the break points. If there is a large angle, then both quadrants, i.e., TL and TR, may be blocked with masking. For example, an angle of 100 degrees may leave little iris left in the two quadrants.

Figure 8:
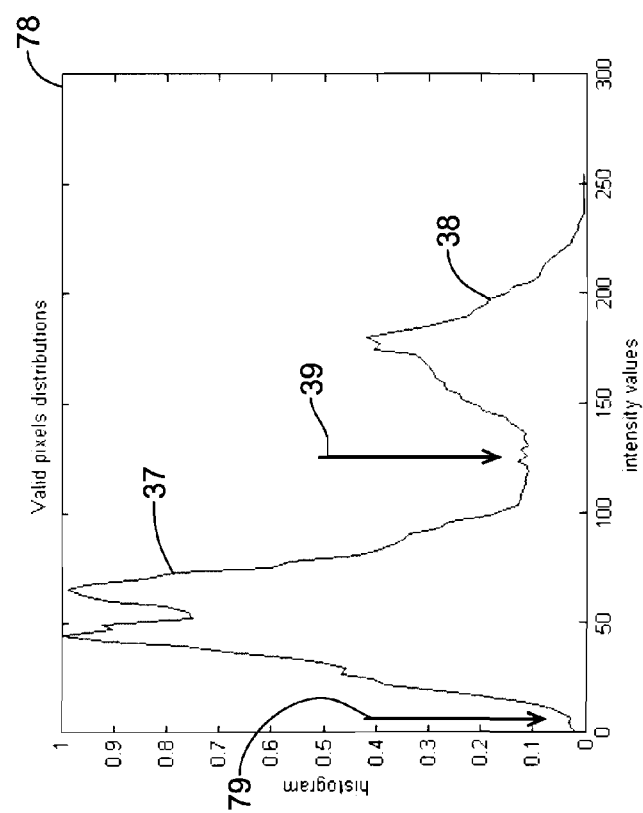
FIGS. 8 and 9 are histograms showing pixel clustering based on distribution.

FIG. 8 is a graph 78 of histogram data versus intensity values for typical pixel distributions. One may discriminate between iris and non-iris pixels by clustering pixel distributions. This process relates to map analysis involving a stage for extracting outliers in the iris map. The may be clusters 37 and 38 of pixels outliers. Cluster 37 may be set out by valleys 39 and 79 in the histogram 78. The iris pixels should be part of just one cluster as the color of the iris would tend to result in pixels having a similar intensity since there is generally one overall color in the iris. Cluster 37 appears to be the one with the iris pixels. Cluster 38 would then be noise such a blocked lower portion of the iris or a bright reflective spot on the iris which may be regarded as an outlier. Such portion may be masked out in an iris map. Additional filtering may be considered at the feature extraction stage to clean up outliers from the iris map. There may be no need to add another segmentation process in the lower lid segmentation.

Figure 9:
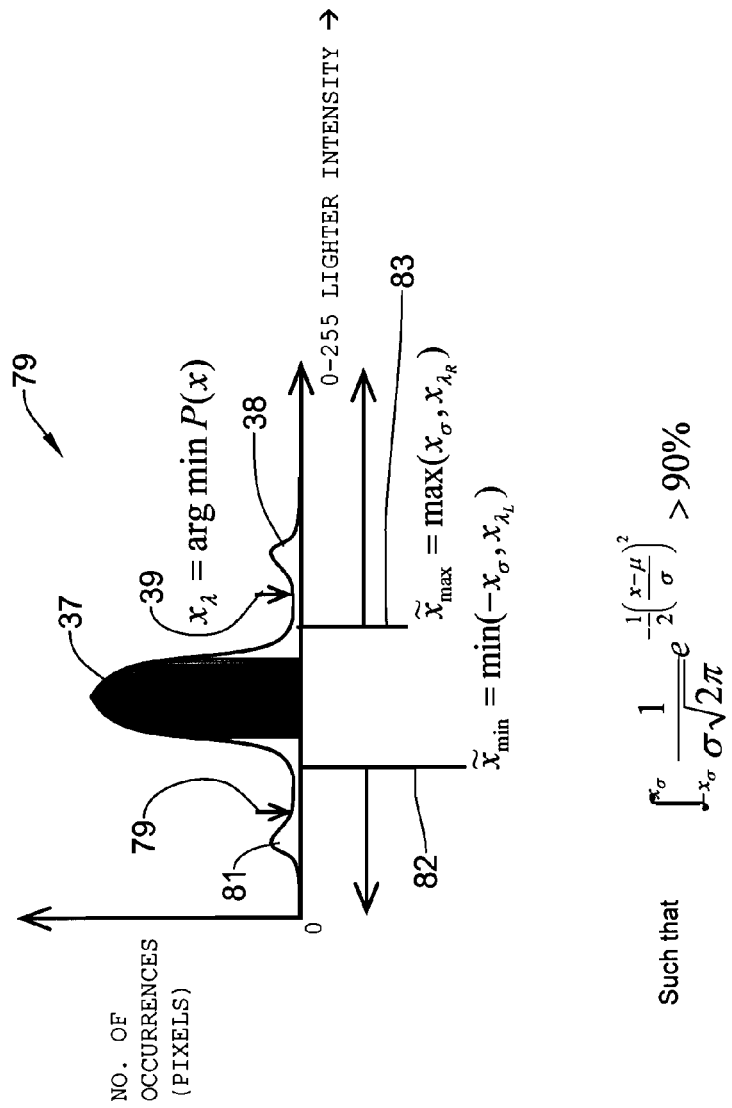

There may be leaked pixels from a cluster to another due to poor segmentation or other artifacts, e.g., reflections. Thus searching for the valley points among cluster may result in misplacement of the actual limits of the clusters. Thus one may impose limitations on the extent of valley searches by guaranteeing at least 90 percent of the iris pixels to be within the iris cluster. FIG. 9 shows an extension of intensity ranges associated with the imposed limits and a statement (i.e., formulas) of how to obtain these limits. There may be a certain percentage (e.g., 90 percent) of a distribution that covers a prominent cluster which likely represents the iris. An extraneous cluster outside the certain percentage of the distribution may represent noise subject to removal (10 percent expected percentage of noisy pixels).

$$\tilde{x}_{max} = \max(x_\sigma, x_{\lambda_R})$$

$$\tilde{x}_{min} = \min(-x_\sigma, x_{\lambda_L})$$

Such that $$\int_{-x_\sigma}^{x_\sigma} \frac{1}{\sigma\sqrt{2\pi}} e^{-\frac{1}{2}\left(\frac{x-\mu}{\sigma}\right)^2} > 90\%$$

Where $\lambda_R$ and $\lambda_L$ are the detected valleys in the right and left side of the iris pixel cluster. The cluster 37 of pixels represents the iris. Extraneous clusters 38 and 81 may be noted on both sides of cluster 37, separated by valleys 39 and 79, respectively. The iris map may be adaptively thresholded on the basis of intensity of the pixels. Assuming normal distribution, one would seek to keep 90 percent of the area of pixels including the main cluster 37. One may impose limits left and right at lines 82 and 83, respectively, or both to obtain at most 90 percent coverage. The 90 percent approach, although it could be another percentage especially if there is no valley or only one valley to separate or distinguish cluster 37, may guarantee enough area of the iris with cluster 37 for matching, analysis, identification, and/or the like. The remaining area is generally noise which may be removed.

Figure 10:
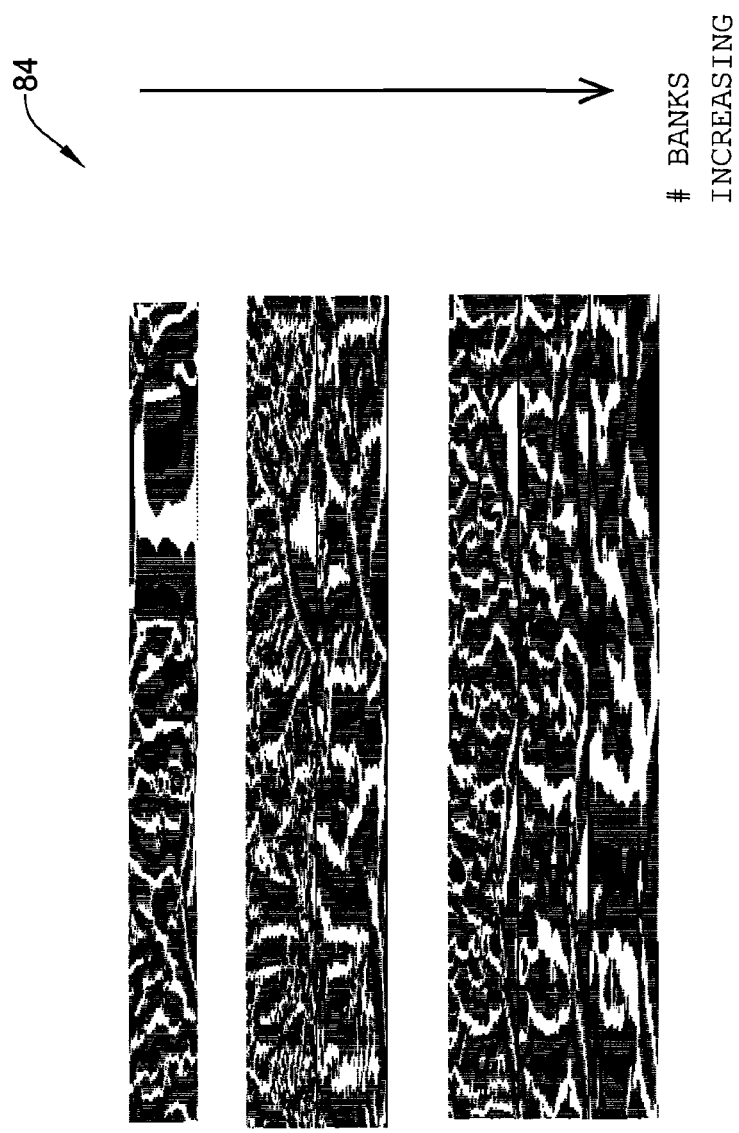
FIG. 10 is a diagram of one, two and three banks of code bits related to iris analysis.

FIG. 10 illustrates a multi-band (i.e., frequency) analysis with a showing of one, two and three banks 84 of code bits related to an iris. Each bank may have a filter and weighted appropriately in the matching process.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A method for iris recognition comprising:
locating an eye with a camera;
obtaining an image of the eye with the camera;
assessing the image of the eye with a set of image quality metrics with a processor; and
segmenting the iris in the image of the eye with the processor;
wherein the set of image quality metrics comprises:
an offset measurement of the eye in the image of the eye; and
a gaze measurement of the eye in the image of the eye;
wherein a calibration of the segmenting of the iris is determined by the offset and gaze measurements; and
wherein:
if the offset and gaze measurements indicate offset or gaze of the eye in the image of the eye, then the segmenting of the iris is based on no circular calibration; and
if the offset and gaze measurements. indicate no offset or gaze of the eye, then the segmenting of the iris is based on circular calibration.

2. The method of claim 1, further comprising determining a quality score of the image of the eye with the set of image quality metrics with the processor.

3. The method of claim 2, further comprising:
determining a matching score of the image of the eye based on matches of the image of the eye with other images of the eye with the processor; and
establishing an evaluation score based on the quality score and the matching score with the processor.

4. The method of claim 1, wherein the set of image quality metrics further comprises:
a validity measurement of the image of the eye; and
a blur measurement of the image of the eye.

5. A method for iris recognition comprising:
locating an eye with a camera;
obtaining an image of the eye with the camera; and
assessing the image of the eye with a set of image quality metrics with a processor; and
segmenting the iris in the image of the eye with the processor;
wherein the set of image quality metrics comprises:
an offset measurement of the eye in the image of the eye; and
a gaze measurement of the eye in the image of the eye;
wherein a calibration of the segmenting of the iris is determined by the offset and gaze measurements;
wherein the set of image quality metrics further comprises:
an obscuration measurement of the eye in the image of the eye; and
a visibility measurement of the iris of the eye; and
wherein:
if the obscuration measurement of the eye reveals the eye not to be obscured, then a map of an iris of the eye is extracted with the processor; and
a visibility measurement of the iris in the map of the iris is made with the processor.

6. The method of claim 5, further comprising:
coding the iris in a single band code and/or multi-band code with associated weights based on the image quality metrics with the processor; and
matching the single band code and/or multi-band code with other codes of the iris with the processor.

7. The method of claim 6, wherein the set of image quality metrics further comprises:
a validity measurement of the image of the eye; and
a blur measurement of the image of the eye; and
wherein the associated weights based on the image quality metrics used in coding the iris are based at least in part on the blur measurement.

8. A method for iris recognition comprising:
locating an eye with a camera;
obtaining an image of the eye with the camera; and
assessing the image of the eye with a set of image quality metrics with a processor; and
segmenting the iris in the image of the eye with the processor;
wherein the set of image quality metrics comprises:
an offset measurement of the eye in the image of the eye; and
a gaze measurement of the eye in the image of the eye;
wherein a calibration of the segmenting of the iris is determined by the offset and gaze measurements; and
wherein segmenting the iris includes a quadrant iris analysis performed with the processor, the quadrant iris analysis comprising:
finding a first limit in a first quadrant toward a second quadrant, starting from a sclera in a first direction;
finding a second limit in newly defined second quadrant based on the first limit, starting from the sclera at the horizontal axis in a second direction opposite the first direction;
applying an interpolation/mask test to the first and second quadrants;
finding limits in a third quadrant in a direction toward a fourth quadrant;
finding limits in a newly defined fourth quadrant in an opposite direction; and
applying an interpolation/mask test to the third and fourth quadrants.

9. A system for iris recognition using quality metrics, comprising:
an eye image source;
a quality metric mechanism connected to the eye image source;
an iris map extractor connected to the quality metric mechanism and configured to extract a map of an iris; and
a processor configured to eliminate intensity outliers in the map;
wherein clustering pixel intensities of the map is based on their distributed histogram by selectively choosing limits of the iris as represented in the map using associated valleys on the left and right of an iris pixel cluster.

10. A system for iris recognition using quality metrics, comprising:
an eye image source;
a quality metric mechanism connected to the eye image source; and an iris map extractor connected to the quality metric mechanism and configured to extract a map of an iris;
wherein:
a limited range is imposed to preserve a certain percentage of pixel elements of a prominent pixel cluster which likely represents the iris in the map; and
an element beyond the limited range or the estimated thresholds of the pixel cluster represents noise subject to removal.

* * * * *